US009532587B2

(12) United States Patent
Morini

(10) Patent No.: US 9,532,587 B2
(45) Date of Patent: *Jan. 3, 2017

(54) RECONSTITUTABLE AND WATER SOLUBLE CHIA PRODUCT AND RELATED METHOD OF MANUFACTURE

(71) Applicant: Angelo Morini, Windermere, FL (US)

(72) Inventor: Angelo Morini, Windermere, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,202

(22) Filed: Jun. 7, 2016

(65) Prior Publication Data

US 2016/0286842 A1    Oct. 6, 2016

Related U.S. Application Data

(63) Continuation-in-part of application No. 14/634,079, filed on Feb. 27, 2015, now Pat. No. 9,386,795.

(60) Provisional application No. 61/946,239, filed on Feb. 28, 2014.

(51) Int. Cl.
  A23L 1/10    (2006.01)
  A23L 1/36    (2006.01)
  A23L 1/00    (2006.01)
  A23L 2/52    (2006.01)
  A23L 1/30    (2006.01)

(52) U.S. Cl.
  CPC ............. *A23L 1/366* (2013.01); *A23L 1/0035* (2013.01); *A23L 1/30* (2013.01); *A23L 2/52* (2013.01)

(58) Field of Classification Search
  CPC .......... A23L 1/0526; A23L 1/40; B02C 11/00; B02C 23/18; B02C 9/04
  USPC ........ 426/557, 573, 629, 633, 641, 659, 660
  See application file for complete search history.

(56) References Cited

U.S. PATENT DOCUMENTS 9,386,795 B2 *  7/2016  Morini ................ A23L 1/366
2010/0310719 A1 * 12/2010 Finney ................ A21D 2/266
                                            426/44
2012/0015093 A1 *  1/2012 Finney ................ A23L 1/308
                                           426/589

* cited by examiner

Primary Examiner — Michele L Jacobson
Assistant Examiner — Subbalakshmi Prakash
(74) Attorney, Agent, or Firm — Jason T. Daniel, Esq.; Daniel Law Offices, P.A.

(57) ABSTRACT

A method provides a reconstitutable and water soluble free flowing powder product that includes non-mucilaginous, non-oily free flowing chia grains having a size of between approximately 80 and 90 microns, a pH range of between 6.5 and 7.5, 3% average moisture, and a centipoise value of between approximately 1,000 and 1,500 cp which revert to a sub-micron size when suspended within an aqueous solution.

13 Claims, 1 Drawing Sheet

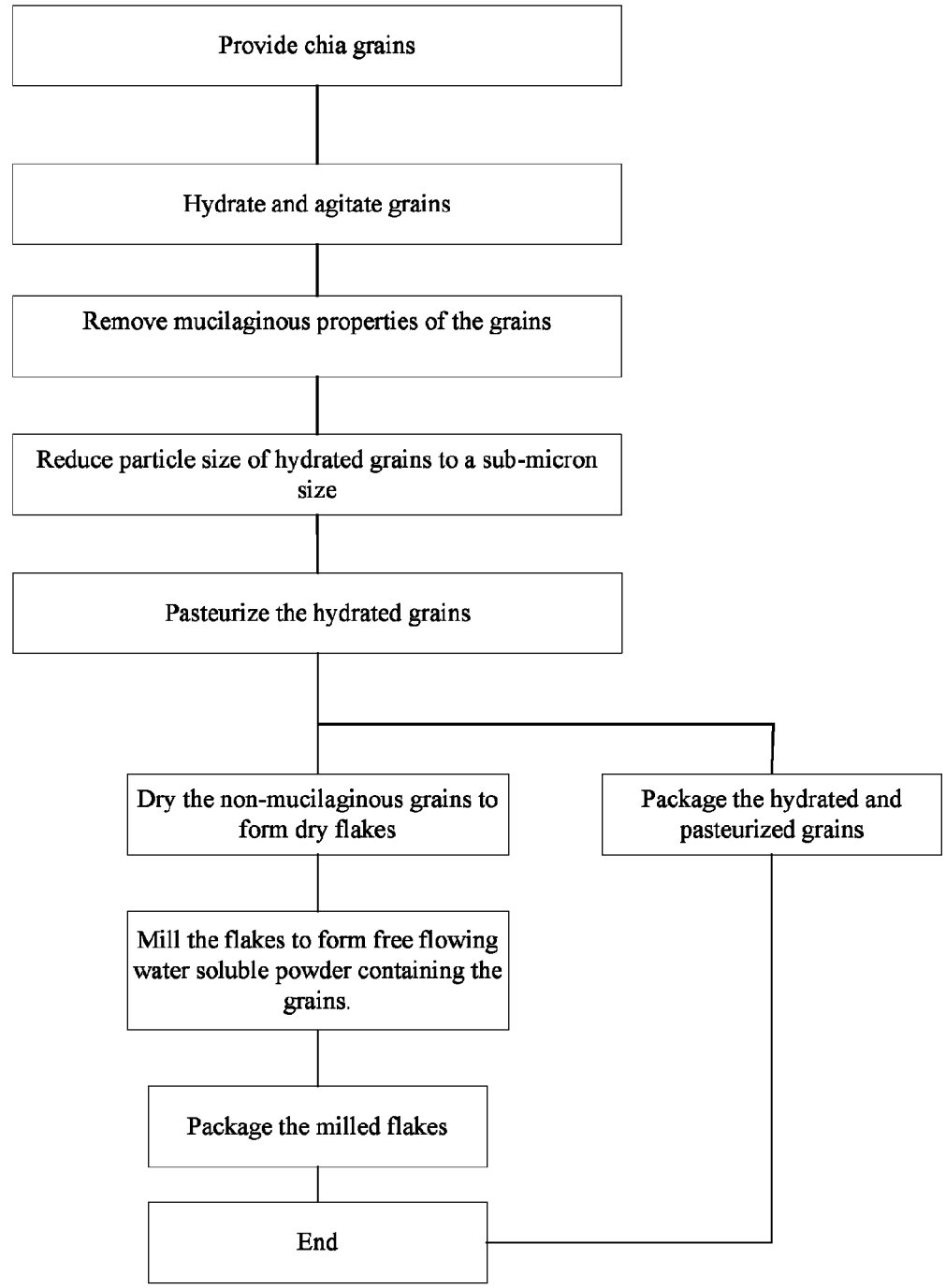

RECONSTITUTABLE AND WATER SOLUBLE CHIA PRODUCT AND RELATED METHOD OF MANUFACTURE

CROSS-REFERENCE TO RELATED APPLICATIONS

This application is a continuation-in-part of, and claims priority to U.S. Application Ser. No. 61/946,239 filed on Feb. 28, 2014, and U.S. application Ser. No. 14/634,079 filed on Feb. 27, 2015, the contents of each of which are incorporated herein by reference.

TECHNICAL FIELD

The present invention relates generally to grain and seed processing, and more particularly to a system and method for producing a water soluble Chia product.

BACKGROUND

Essential Fatty Acids are nutritional cornerstones of human health. One such fat includes Omega-3, which is deemed 'essential' for humans because it is needed for proper health. However, much like certain vitamins and minerals, humans are not able to produce this fatty acid on their own. As a result, it is important to ensure that a sufficient amount of Omega-3 is consumed through a balanced diet and/or through supplementation.

Although Omega-3's are most commonly associated with cardiovascular health, recent studies have shown that the two main omega-3 components eicosapentaenoic acid (EPA) and docosahexaenoic acid (DHA) can help lower triglycerides, body inflammation and blood pressure. Additional studies have shown that omega-3 fatty acids may also help with rheumatoid arthritis, depression, and other such conditions.

*Salvia hispanica* L, commonly known as chia, is a species of flowering plant in the mint family, and is high in Omega-3 fatty acids. Through extensive research and development, the inventor of the presently claimed invention has developed a new and commercially available cultivar of *Salvia hispanica* L called Anutra®. The Anutra® grain is FDA and USDA approved and was created without the aid of genetically modified organisms (Non-GMO) to generate the highest and safest natural source of Omega-3's, antioxidants, fiber, complete protein, and other important phyto-nutrients available on the market.

Although useful as a grain, chia seeds, such as Anutra® are not naturally water soluble. Although chia seeds can absorb up to 12 times their weight in liquid, the immersed chia seeds develop a mucilaginous gel-like coating that results in a distinctive and unpleasant texture that is "gritty" in nature. As such, attempts to introduce the beneficial effects of chia, and more specifically Anutra® directly into beverages, or to create a water soluble powder which can be added to a beverage as a supplement have been unsuccessful.

Various attempts have been made in the field of whole seed processing and controlled viscosity products. One such example includes U.S. Patent Publication No. 2012/0015093, the contents of which are incorporated herein by reference in its entirety for the disclosure.

Although the above noted disclosure is useful with respect to its stated objective, the above identified document does not disclose a system or method for producing a water soluble chia product, as described herein.

SUMMARY OF THE INVENTION

The present invention is directed to a reconstitutable and water soluble chia powder product and a method of manufacturing the same.

In one embodiment, a method produces a chia powder product that includes non-oily free flowing grains having a size of between approximately 80 and 90 microns, a pH range of between 6.5 and 7.5, a 3% average moisture, and a centipoise value of between approximately 1,000 and 1,500 cp. When the product is mixed with an aqueous carrier such as water, juice or other such beverages, the composition can revert to a sub-micron size that is non-mucilaginous and water soluble.

In another embodiment, the method includes providing the above described sub-micron grains that are packaged within an aqueous solution.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 1 is a process flowchart for preparing a reconstitutable and water soluble chia powder product according to a current embodiment.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the presently claimed invention contemplates the use of the commercially available cultivar of chia known as Anutra®. For ease of description, however, the terms Anutra and chia will be used interchangeably throughout this document. Moreover, although described with respect to chia, those of skill in the art will recognize that the inventive concepts disclosed herein can also be applied to other forms of grains and whole seeds such as flax, for example, in order to create a dry powder product that is water soluble.

Chia, in its natural state is a non-soluble dark brown grain that is very mucilaginous, has a high bacteria plate count, a bitter aftertaste, and has a centipoise (cp) range of between 150,000 and 200,000 when mixed with equal parts water.

Through extensive research and study, the inventor of the present application has developed a novel method and system for transforming chia grain/seeds into a composition of matter which is a dry, reconstitutable powder that is water soluble.

The composition of the current embodiment can include a dry, reconstitutable powder of non-GMO chia grains having a size between approximately 80 and 90 microns that is loose and contains no oily residue. The PH range can be between 6.5 and 7.5 with 3% average moisture and a centipoise range of between 1,000 and 2,000 cp. When the composition is mixed with an aqueous carrier such as water, juice or other such beverages, the composition can revert to between 50 and 53 microns that is non-mucilaginous and water soluble.

One embodiment of a method for creating a reconstitutable and water soluble chia powder product can include the following steps, which are generally illustrated in the flowchart of FIG. 1. Other features of the current embodiments will become apparent in the course of the following descriptions, which are given for illustration of the current embodiments, and are not intended to be limiting thereof.

Step 1. Acquiring/producing suitable chia grains. In the preferred embodiment, suitable chia grains will include Anutra® whole grain chia having an average grain size of approximately 2 mm, however other forms, types and brands of chia are also contemplated. In either instance, the chia grains will preferably be clean and dry.

Step 2. Mixing and agitating the chia whole grains from step 1 with an aqueous carrier such as water for a specific amount of time, and at a specific ratio, temperature, and PH level.

In the preferred embodiment, the mixture ratio can include approximately 87.5% water and 12.5% chia grains; the temperature of the water can be approximately 175° F., which is maintained throughout the entirety of the step; the PH level of the water and grain can be adjusted in accordance with known mediums such as lemon juice or citric acid, for example, until a range of between 6.5-7.5 is obtained and maintained throughout this step. In another embodiment, additional ingredients such as vitamin C, vitamin A, tocopherols, beta carotene, and other antioxidants can be added to the mixture at a preferred dosage of 750 parts per million. The addition of these substance can function to increase the health benefits of the resulting product. The mixing process can occur in a steel tank or other suitable vessel wherein moderate mechanical agitation can be applied for approximately 2 hours before draining. The agitation can be performed manually or mechanically utilizing any number of commercially available agitation devices.

After the agitation process has completed, the resulting hydrated chia grains will include an average size of between 2.5 mm and 4 mm, having a temperature of 175° F. and a centipoise of between 10,000 and 25,000 cp based on 50% water solution.

At step 3, the hydrated chia grains from step 2 can be transferred to an industrial mixer/high shear device which can reduce the particle size of each grain. In the preferred embodiment, the industrial mixer can include a rotor/stator workhead operating at 10,000 RPM for 90 minutes so as to reduce the particle size of each chia grain to approximately 140 microns, while maintaining a temperature of approximately 175° F. One example of a suitable industrial mixer includes the Model L Top entry mixer that is commercially available from Kady® International. Of course, any number of other mixers capable of achieving the same results are also contemplated.

Once the particle size has been reduced, the batch can rest for approximately 30 minutes before moving to step 4. At this time, the resulting hydrated chia grains will have maintained a moisture ratio of 87.5% water and 12.5% chia grains; the temperature will be maintained at 175° F., the particle size will be at or about 140 microns, and the Centipoise range will be between 1,000 and 2,000 cp in 50% water solution.

At step 4, the hydrated chia grains from step 3 can be run through a positive pump heat exchanger to increase the grain temperature to approximately 180° F., while maintaining the same moisture ratio, size, PH, and centipoise.

At step 5, the hydrated chia grains from step 4 can be pumped to another high shear device such as a two stage homogenizer, for example, in order to further reduce the grain size and to remove the mucilaginous properties of the chia grains. In the preferred embodiment, once back pressure reaches 50 psi, the two stage homogenizer is started in recycle mode, the air bleed is taken out of the recycle lines, and the pressure is raised to approximately 1,000 psi on the 2nd stage and approximately 6,000 psi on the 1st stage and then two stage is put in forward flow wherein the resulting product is discharged into storage containers and rested for approximately one hour. One example of a suitable homogenizer includes the commercially available Niro Sovai Homogenizer Model NS-3011H. Of course, any number of other devices capable of achieving the same results are also contemplated.

At this time, the resulting hydrated chia grains will have maintained a moisture ratio of 87.5% water and 12.5% chia grains, the temperature will remain at or near 180° F., and the PH range will remain between 6.5 and 7.5. However, the particle size will be reduced to approximately 50-53 microns, the centipoise range will be between 1,000 and 1,5000 cp, based on 50% water content, and the grains will be non-mucilaginous.

Depending on the intended use of the product, the resulting hydrated grains can be packaged and/or combined with other products in the current hydrated state. In this regard, the method can conclude at this time wherein the hydrated grains are suspended within an aqueous carrier as the final product.

In many other instances, it is desirable to fully dry the hydrated grains so as to allow the same to by rehydrated at a later time. As such, the method can proceed to step 6, wherein the hydrated grains can be inserted into a commercial roll dryer such as a positive pump running at 41 Hz, steam pressure at 100 psi and a drum speed at 20 Hz, for example, in order to achieve grain moisture levels between approximately 2% and 3%, and the overall batch moisture to approximately 3.00%. At the conclusion of this process, the batch of product can exit the roll dryer in large sheets and augers or other such devices can break the product into flakes ranging between approximately 1 and 3 inches in diameter. The flakes can then be sealed within 30 gallon fiber drums with plastic liners, and rested for approximately 1-2 hours until reaching ambient temperature typically between 70-78° F.

Roll dryers for grain, seeds and other such material are extremely well known in the art. One suitable example can include the commercially available Dryer Master DM510. Of course, any number of other devices such as a spray dryer, for example, that are capable of achieving the same results are also contemplated.

At this time, the resulting product will include non-mucilaginous dry flakes ranging in size from between 1 and 3 inches in diameter, at ambient temperature, and having a PH range of between 6.5 and 7.5.

At Step 7, the flakes from step 6 can be dry milled to form the reconstitutable and water soluble chia powder product. In the preferred embodiment, the dry mill can include a cone mill with a 2 mm screen wherein the flakes can be broken into free flowing dry grains having an average size of between 80 and 90 microns. At this time, the resulting product can be bagged and shipped for consumption.

At the conclusion of step 7, the reconstitutable and water soluble chia powder product will include non-mucilaginous, non-oily free flowing grains having a size of between approximately 80 and 90 microns, a PH range of between 6.5 and 7.5, 3% average moisture, and a centipoise of between approximately 1,000 and 1,500 cp, with 50% water solution. When the product is mixed with an aqueous carrier such as water, juice or other such beverages, the individual grains can revert to between 50 and 53 microns in size.

Although described above as including two distinct heating steps for pasteurization of the product, many other forms of pasteurization at different stages of the described method are also contemplated. To this end, the hydrated chia grains can be pasteurized to remove any harmful bacteria at any time before the drying process. Pasteurization can be performed utilizing any number of known methodologies and mechanisms such as high temperature short time, heating in a vat for several minutes, ultraviolet light pasteurization, high pressure pasteurization and/or radiation based pasteurization.

The final product has a zero plate count because of pasteurization and micro processing. Nutrition is maintained within normal standards of deviation, and bioavailability is increased well beyond 85% of whole grain. The resulting product will now blend well in hot or cold liquids and mix well with dry or semi dry products. The product can be used in almost any food, beverage or supplement application, and will not contain a gritty texture.

In addition to the above, other embodiments are also contemplated wherein the grains are micro-encapsulated via carbohydrates, for example, in order to preserve the resulting product, and to improve shelf life and oxidation. As described herein, the encapsulation can be performed utilizing any suitably machinery and methodology as is known in the art.

Although the reconstitutable and water soluble chia powder product is described above as reverting to approximately 50 and 53 microns when hydrated or consumed, this is but one preferred size capable of being achieved by the above described method. However, other embodiments are also contemplated wherein the reconstitutable and water soluble chia powder product can include a sub-micron size when suspended with an aqueous carrier.

In this regard, another embodiment of the above method can further include step 3.5, which can be performed between the above described steps 3 and 4. As such, in step 3.5, the hydrated chia grains from step 3 can be run through another high shear device such as a bead mill, for example, having a plurality of 2 mm glass beads, for example, which can function to reduce the particle size of the grains to a first sub-micron size. In the preferred embodiment, the first sub-micron size achieved by this step can be between approximately 0.5 and 0.9 microns, for example. The resulting product can ultimately be pasteurized and packaged within an aqueous solution, or can proceed directly to step 6 wherein it can be dried and milled.

Additionally, or as an alternative to the above, the resulting solution from step 3.5 can proceed through steps 4-7, as described above. As a result, upon subsequently passing through the high shear device described above at step 5, the dry reconstitutable and water soluble chia powder product of step 7 can revert to a second sub-micron size of between approximately 0.1 microns and 0.5 microns, when suspended within an aqueous carrier. Of course, other sub-micron sizes are also contemplated. In either instance, the ability to provide the product at such a small size allows the product to be suitable for use in pharmaceuticals and/or intravenous feedings, for example, while maintaining complete grain nutrition.

Although described above as utilizing particular machinery and/or steps in a particular order, this is for illustrative purposes only. To this end, those of skill in the art will recognize that any number of different types of machinery can be utilized, as described above to create the reconstitutable and water soluble chia powder product. Additionally, the above noted steps may also be performed in an order different than that described above. As such, the invention is not to be construed as limiting.

Finally, those of skill in the art will realize that any number of additives can also be combined within the product, the items including but not limited to coffee, tea, herbs, fruits, vegetables, roots, sugars, spices, proteins, carbohydrates, lipids, vitamins minerals, and fiber, for example, in order to augment the taste, consistency and/or health benefits of the final product. One or more of these items can be introduced at any step of the manufacturing process, in accordance with manufacturing techniques.

The process can also be used to produce mixtures of Anutra (all chia types) products that are new molecules as well as combinations of existing molecules including all and any items used in foods, supplements, and pharmaceuticals such as proteins (amino acids plant or animal), vitamins, minerals, lipids, fibers, sugars, carbohydrates, enzymes, bacteria, viruses, fungus, protozoa, prion, etc.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of preparing a water soluble chia composition, said method comprising:
   providing chia grains;
   combining the chia grains with an aqueous carrier to create a mixture;
   agitating the mixture for a first period of time;
   processing the mixture through a first high shear device to reduce a particle size of the grains within the mixture to approximately 140 microns, and to remove a mucilaginous property of the grains; and
   processing the mixture through a second high shear device to further reduce the particle size of the grains within the mixture to a first sub-micron size.

2. The method of claim 1, further comprising:
   pasteurizing the mixture.

3. The method of claim 2, further comprising:
   packaging the pasteurized mixture.

4. The method of claim 2, further comprising:
   drying the pasteurized mixture to create dry flakes having a moisture level of between approximately 2% and 3%.

5. The method of claim 4, further comprising:
   milling the flakes to create dry grains having a size of between approximately 80-90 microns.

6. The method of claim 5, wherein the dry grains revert to the first sub-micron size when suspended within an aqueous carrier.

7. The method of claim 6, wherein the first sub-micron size is between approximately 0.5 and 0.9 microns.

8. The method of claim 5, further comprising:
   processing the mixture through a third high shear device to reduce the particle size of the grains within the mixture to a second sub-micron size,
   wherein said second sub-micron size is smaller than the first sub-micron size, and
   said processing the mixture through a third high shear device is performed before said step of drying the pasteurized mixture.

9. The method of claim 8, wherein the dry grains revert to the second sub-micron size when suspended within an aqueous carrier.

10. The method of claim 9, wherein the second sub-micron size is between approximately 0.1 and 0.5 microns.

11. The method of claim 8, wherein the first high shear device, the second high shear device and the third high shear device each include, at least one of a rotor/stator work head, a bead mill, and a two-stage homogenizer.

12. A reconstitutable and water soluble chia composition produced by the method of claim 1, said composition comprising:
   dry non-oily free flowing grains having a size of approximately 80-90 microns that revert to a size of between approximately 0.1 and 0.9 microns when mixed with an aqueous carrier.

13. A reconstitutable and water soluble chia composition, said composition comprising:
   dry non-oily free flowing grains having a size of approximately 80-90 microns that revert to a size of between approximately 0.1 and 0.9 microns when mixed with an aqueous carrier.

* * * * *